United States Patent [19]

Bruggendick et al.

[11] Patent Number: 5,177,876

[45] Date of Patent: Jan. 12, 1993

[54] REACTOR INSTALLATION FOR COUNTERCURRENT TREATMENT OF GASES AND BULK SOLIDS

[76] Inventors: Hermann Bruggendick, Dorstener Strasse 32, D-4224 Humxe; Karl Klinginger, Tamperestrasse 30, D-4300 Essen 14, both of Fed. Rep. of Germany

[21] Appl. No.: 466,361

[22] PCT Filed: Sep. 15, 1988

[86] PCT No.: PCT/EP88/00844

§ 371 Date: Mar. 14, 1990

§ 102(e) Date: Mar. 14, 1990

[87] PCT Pub. No.: WO89/02779

PCT Pub. Date: Apr. 6, 1989

[30] Foreign Application Priority Data

Sep. 25, 1987 [DE] Fed. Rep. of Germany ....... 3732424

[51] Int. Cl.$^5$ ............................................. F26B 17/12
[52] U.S. Cl. ......................................... 34/33; 34/167; 34/168; 34/165
[58] Field of Search .............. 34/165, 167, 168, 171, 34/178, 33, 57 R, 57 A, 57 C, 10

[56] References Cited

U.S. PATENT DOCUMENTS

| 2,671,057 | 3/1954 | McClure | 34/33 |
|---|---|---|---|
| 2,684,930 | 7/1954 | Berg | 34/33 |
| 2,766,534 | 10/1956 | Schaub et al. | 34/33 |
| 3,305,939 | 2/1967 | Sonneschein et al. | 34/168 |
| 3,327,611 | 6/1967 | Pedersen | 99/237 |

FOREIGN PATENT DOCUMENTS

| 2004966 | 9/1970 | Fed. Rep. of Germany . |
|---|---|---|
| 3313943 | 11/1983 | Fed. Rep. of Germany . |
| 400436 | 7/1909 | France . |
| 1020410 | 2/1953 | France . |
| WO87/00768 | 2/1987 | World Int. Prop. O. . |

*Primary Examiner*—Henry A. Bennet
*Assistant Examiner*—Denise L. F. Gromada
*Attorney, Agent, or Firm*—Young & Thompson

[57] ABSTRACT

The invention relates in general to a reactor installation for countercurrent treatment of gases and bulk solids and, in particular, to a moving bed reactor installation with at least one reaction chamber which latter has at least one inlet and at least one outlet for passing therethrough a solid material present in bulk from the top toward the bottom countercurrently to a gas, at least one flow baffle by means of which the gas is conducted from the bottom toward the top into the bulk material present in the reaction chamber, at least one first sliding surface for the bulk material, arranged above the reaction chamber and terminating at its upper end into a feeding shaft or hopper and supplying the inlet of the reaction chamber with bulk material, and at least one second sliding surface for the bulk material, arranged below the outlet, wherein the sliding surfaces are inclined regarding the horizontal to such an extent that the bulk material is conveyed in the inclined direction solely under the action of gravity.

23 Claims, 2 Drawing Sheets

REACTOR INSTALLATION FOR COUNTERCURRENT TREATMENT OF GASES AND BULK SOLIDS

BACKGROUND OF THE INVENTION

Reactors of the type under consideration herein generally serve for bringing a gas into intimate contact with a solid available as a bulk material in order to bring about a reaction and/or adsorption between gas and solid. Such reactors are utilized in the catalytic conversion of gases, in the adsorption of gases, or in fine dust filtering. In general, the bulk material is conducted through the reactor from the top toward the bottom while the gas is passed over the solid in a crosscurrent or countercurrent fashion. The countercurrent operation generally affords better contact and better distribution between the two phases and therefore is more effective, i.e., has a higher degree of efficiency. However, the practical realization of reactor installations of the type discussed above has met with considerable problems and thus far has not as yet been accomplished, at least not on an industrial scale.

A moving bed reactor of the aforementioned type has been known from German Laid-Open Patent Application No. 3,313,943, wherein the bulk material is introduced centrally into the reaction chamber by way of the first inclined sliding surface. After passing through the reaction chamber, the bulk material enters a regenerating device located therebeneath. The material is discharged from the regenerating device via a second sloping sliding surface and passes to the base of a vertical conveying shaft; in the latter, the material travels upwardly to the first inclined sliding surface. In many usages of such reactors, thus, for example, in removing pollutants from flue gases, the gas must be treated in multistage fashion in various reactors. First of all, the flue gas passes through at least one reactor wherein an $SO_2$ cleaning step is performed. Only thereafter will $NO_x$ reduction take place in a further reactor stage. In industrial plants, such as power plants, for example, the volume stream of flue gas produced is so considerable that it can be treated in accordance with regulations only in parallel reactor stages. In these large-scale industrial uses, reactor systems must thus be provided which consist of several reactor modules serving for identical types of treatment as well as different-type treatments. A module-type combination of several moving bed reactors of the conventional type of structure is impossible, above all, for the reason that the devices for feeding, discharging, and conveying the bulk material cannot be connected in parallel and/or in series. Furthermore, the known reactors occupy a relatively large construction volume.

SUMMARY OF THE INVENTION

It is, therefore, an object of the invention to design a reactor installation of the type discussed hereinabove in a module form in such a way that each reactor module occupies a small amount of space and the feeding and discharging of bulk material can be effected along particularly short routes and with simple means.

In order to attain this object, the reactor installation of this invention is characterized in that the first sliding surface and the second sliding surface are inclined in the same direction. The bulk material is thus fed to the reactor on one side and withdrawn on the other side. Consequently, parallel and/or series connections can be realized. Also, feeding and discharging of the bulk material take place in the simplest way imaginable, namely only and solely under the action of gravity. The reactor installation according to this invention requires a minimum of space.

Preferably, the first sliding surface is provided in the form of a bulk distributing plate. Thus, it combines the functions of transverse conveyance of the bulk material and its distribution over the entire cross section of the reaction chamber. The corresponding proportions of material are introduced, starting with the sliding surface, into the inlets of the reaction chamber by conventional means, such as flaps, slide gates, or the like. Such sliding surfaces acting as delivery and distributing plates work without moving parts and are independent of the function of a drive mechanism. Therefore, they are not only more economical, but also more reliable.

Preferably, the first bulk material distributing plate, carrying the first sliding surface, forms the bottom wall of a flat channel. This bottom wall of the channel directly adjoins the reaction volume of the associated reaction chamber, so that the bulk material present in the channel is in heat-exchange relationship with the interior of the associated reaction chamber through the bulk material distributing plate. In this way, the bulk material is preheated by the reactor, and condensation in the distributing channel is prevented.

A reactor constructed in accordance with the principle of this invention is especially suitable as a module in a multistage reactor installation. In a preferred embodiment of the invention, several reaction chambers are arranged in superposition, the sliding surfaces of several superimposed reaction chambers being branched off, with their respectively upper ends, from a joint feeding shaft extending preferably in the vertical direction, and at least a portion of the second sliding surfaces terminating, with their lower ends, into a joint bulk material discharge shaft through which the bulk material is removed under the effect of gravity.

Differently from conventional, driven conveyors, an inclined bulk distributing channel as well as an inclined discharge channel, wherein the bulk material can be fed and discharged solely under the force of gravity transversely to the throughflow direction of the reaction chamber, contribute merely slightly to the total height of a reaction chamber column. This is due, above all, to the fact that at least the first sliding surface serving for feeding purposes can be formed directly on the reactor cover wall, and the feeding channel has an only very small structural height. An even more compact structure can be achieved in a column of superimposed reaction chambers by providing that a bulk material distributing channel, defined on the bottom side by the first inclined sliding surface, has a cover wall, the top side of which is used to provide the second inclined sliding surface associated with a reaction chamber located thereabove, this second sliding surface serving for discharging bulk material. In this arrangement, the sliding surfaces feeding and discharging the bulk material can have, in pairs, approximately identical angles of inclination. Preferably, however, the distance between the first sloping sliding surface and the cover wall of the bulk distributing channel located thereabove will increase in the flow direction. With a slight flaring imparted to the bulk distributing channel, normally provided with a box-like cross-sectional profile, the danger of clogging of the distributing channel is minimized even in case of narrow opening cross sections.

Preferably, several approximately vertically extending inlet tubes project from each sloping bulk distributing plate downwardly into the reaction chamber. Furthermore, likewise preferably several solid outlet tubes are extended from each flow baffle downwards through a reaction chamber bottom wall. In order to minimize the danger of clogging in the inlet and outlet, the inlet tubes and/or the outlet tubes flare slightly in trumpet fashion from the top toward the bottom.

For industrial applications, with a plurality of reaction chambers, a reactor installation is suitable, above all, wherein at least two columns of superimposed reactor stages are arranged side-by-side.

The bulk material discharge shaft can also be utilized, in a further development of the invention, for the screening of the dust load of the bulk material. This is done by arranging a gas inlet at the lower end and a filtering means at the upper end of a bulk discharge shaft. This gas inlet can be connected to a gas preheating chamber located between two juxtaposed reaction chambers, especially between the lowermost reaction chambers, and heatable by heat exchange with the latter.

The reaction chambers, just as the sloping feeding and discharge channels, preferably exhibit a rectangular cross section.

Means, for example shoulders or steps, for deflecting the stream of bulk material can be provided in the zone of the branching-off points of the sliding surfaces in the bulk feeding shaft.

In a further development of the invention, the inclination of the bottom wall of the reaction chamber or of a gas end wall on the bottom side in parallel to the inclined sliding surfaces discharging the bulk material can be utilized for conveying, under the action of gravity, solid particles, especially dust, separated from the gaseous stream in the reaction chamber to a location in the reaction chamber in the bottom zone from where the solid particles can be readily removed. For this purpose, a preferably slot-shaped outlet opening is formed in a reaction chamber wall in the region of the lower end of the inclined end wall; through this opening, the separated solid particles can be discharged into the discharge channel or the discharge shaft.

The process of this invention for operating a reactor installation is distinguished in that the bulk material is introduced from a point above and laterally of the reaction chamber along an inclined sliding surface solely under the effect of gravity into the reaction chamber and, behind the outlet, again solely under the action of gravity, is laterally discharged by way of a sliding surface sloping in the same direction, wherein the bulk material to be fed into a reaction chamber is preferably branched off from a stream of bulk material common to several reaction chambers, and several streams of bulk material, after being separately carried off by way of inclined sliding surfaces, are combined in a joint discharge shaft.

Preferably, the combined discharge stream of bulk material is exposed to an oppositely directed gas stream, and the dust particles entrained by the gas stream are filtered out. The same gas stream can also be utilized for affecting the dropping velocity of the particles of bulk material removed in the joint discharge stream.

Additional advantages, details, and effects of the invention can be seen from the following description of the drawing wherein embodiments of the invention are illustrated schematically.

DETAILED DESCRIPTION OF THE PREFERRED EMBODIMENTS

Figure 1:
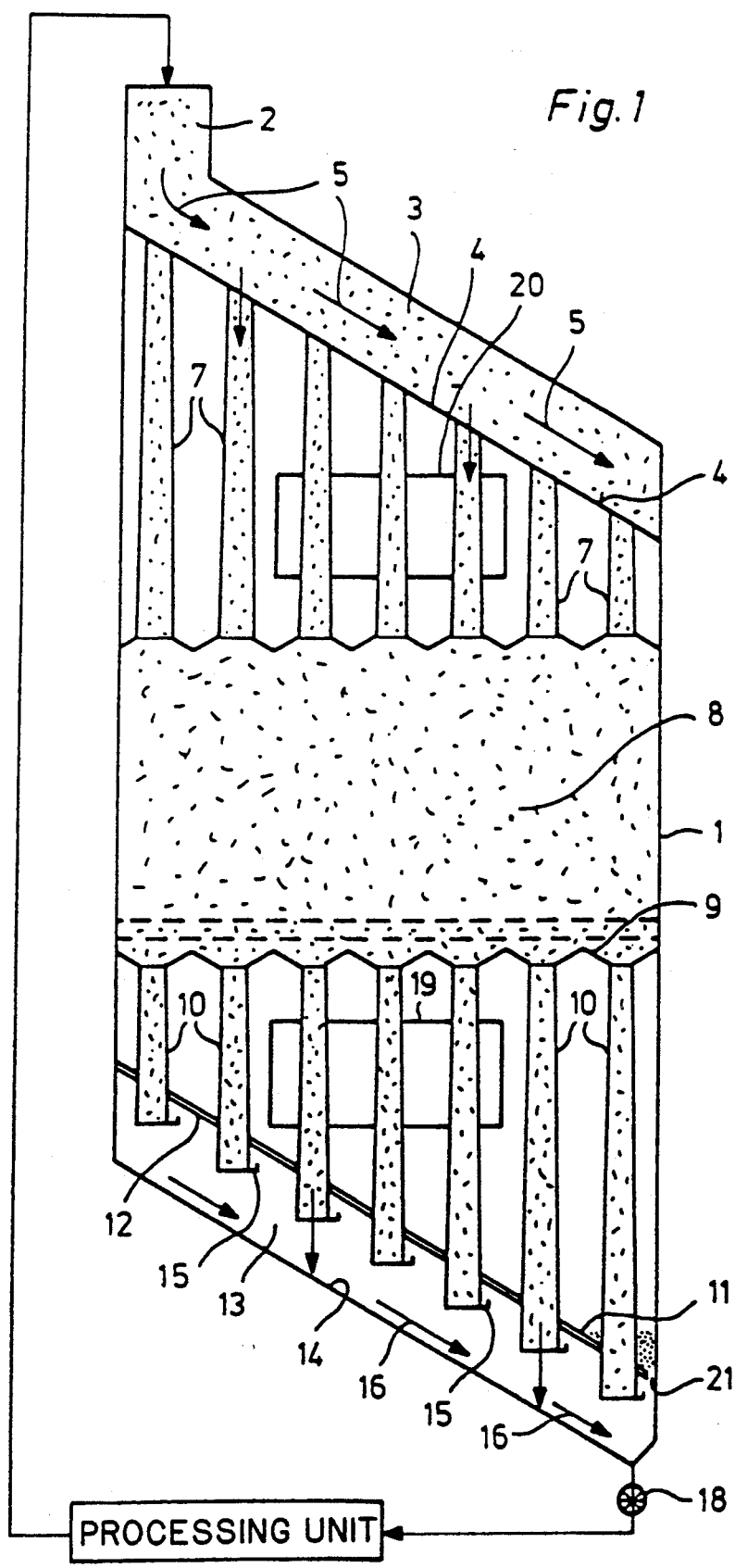
FIG. 1 shows an embodiment of a reactor installation with a single reaction chamber, realizing the principle of the present invention.

FIG. 1 shows schematically a reactor installation with a single reaction chamber 1.

In the described embodiments, the reaction chamber 1 has a rectangular horizontal cross section. A feeding and distributing device for the bulk material is arranged above the reaction chamber 1. This device includes a feeding hopper or shaft 2 and a box-shaped bulk distributing channel 3 inclined by about 45° with respect to the horizontal plane. The distributing channel 3 comprises a distributing plate 4 which also forms the cover wall for the reaction chamber 1. An inclined sliding surface 4' is formed on the top side of the distributing plate 4, the angle of inclination and the surface characteristic of this sliding surface 4 being chosen so that the bulk material which, during operation, usually fills the entire distributing channel 3, is moved, when bulk material is withdrawn, downwardly into the reaction space of the reaction chamber 1 obliquely toward the side and then downwards (arrows 5) solely under its own weight.

Several inlet tubes 7 begin at the sloping distributing plate 4. In the embodiment of the reactor described herein, these tubes 7 can be closed by means, not shown, for example slide gates, flaps, or the like. The inlet tubes 7 extend from the distributing plate 4 vertically downwardly into the reaction space and terminate directly above a reactor bed 8. The tubes 7 exhibit varying lengths in correspondence with the inclination of the distributing plate 4 so that their lower ends lie approximately in a horizontal plane.

The underside of the reactor bed 8 is bounded by a suitable flow baffle 9. The latter can be of conventional structure and will not be described in detail herein. The (exhausted) bulk material, for example activated carbon, is conducted from the flow baffle 9 through outlet tubes 10 vertically downwardly. The outlet tubes 10 are extended, in the zone of the bottom of the reaction chamber 1, first through an inclined gas sealing wall 11 and then through a bottom wall 12 of the reaction chamber 1 extending in parallel to the wall 11. The outlet tubes 10 terminate into a discharge channel 13 extending in a similar manner as the distributing channel 3 essentially over the entire width of the reaction chamber 1 and being inclined with respect to the horizontal plane. Slide gates 15 for selectively shutting off the outlet tubes 10 are arranged on the lower ends of the outlet tubes 10 projecting into the discharge channel 13.

The bottom wall of the box-shaped discharge channel 13 is provided with an inclined sliding surface 14. The slope (angle of inclination with respect to the horizontal plane being between about 40° and 50°, preferably about 45°) as well as the surface characteristic of the sliding surface 14 are chosen so that, after opening the slide gates 15, bulk material discharged from the outlet tubes 10 is carried away laterally toward the right-hand side (arrows 16) solely under the effect of gravity. The bulk material is collected at the right-hand lower end of the discharge channel 13 and passed on conventionally via a rotary vane charging gate, 18 for example, to a processing unit. From the processing unit, the bulk material can optionally be returned to the feeding shaft 2.

While the bulk material is conveyed in the entire reactor installation from the top toward the bottom under its own weight, gas is allowed to flow countercurrently thereto from the bottom toward the top through the reactor bed 8. This gas, in the example illustrated in FIG. 1, enters the reaction chamber 1 through a gas inlet port 19 underneath the flow baffle 9. The gas flows upwardly through the reactor bed 8 and exits above the bed 8, i.e. above the cones of bulk material at the ends of the inlet tubes 7, through an a gas outlet port 20.

In many cases, the gas is loaded with considerable amounts of solid particles, especially dust. These solid particles are partially separated from the gaseous stream at the rerouting points and drop downwards in the reaction chamber 1 even below the flow baffle 9 onto the gas sealing wall 11. Since the latter extends approximately in parallel to the sliding surface 14, i.e. exhibits a corresponding slope, the fine solid particles slide toward the right in FIG. 1 and accumulate in the right-hand lower corner of the interior of the reactor. At this point, a passage opening 21, normally of a slot shape, is provided through which the fine solid particles are discharged from the inner space of the reaction chamber 1 into the discharge channel 13—again under the influence of gravity.

The distributing channel 3 and at least the outlet discharge tubes 10, but in part the inlet feeding tubes 7, are filled with bulk material during operation. However, at least when the slide gates 15 are opened, the bulk material will travel from the top toward the bottom under the effect of gravity. Upon opening the closing elements pertaining to the inlet tubes 7, bulk material drops from the distributing channel 3 into the top ends of the tubes 7, and the remainder of the bulk material present in the sloping channel 3 likewise travels under the action of gravity from the left toward the right, in a sliding motion. The spacing between the bottom and cover walls of the two channels 3 and 13 is preferably between about 150 and 250 mm for most applications in industrial-scale utilization. In the interest of a compact structure, this spacing should be kept at a minimum. With minimum vertical dimensions of the two channels, especially of the distributing channel 3, the spacing between the distributing plate 4 and the cover wall of the distributing channel 3 should slightly increase in the flow direction, i.e. in the direction of arrows 5. The inlet tubes 7 as well as the outlet tubes 10 can flare slightly in trumpet fashion from the top toward the bottom, in correspondence with the illustration in FIG. 1, likewise in order to minimize the danger of clogging.

Figure 2:
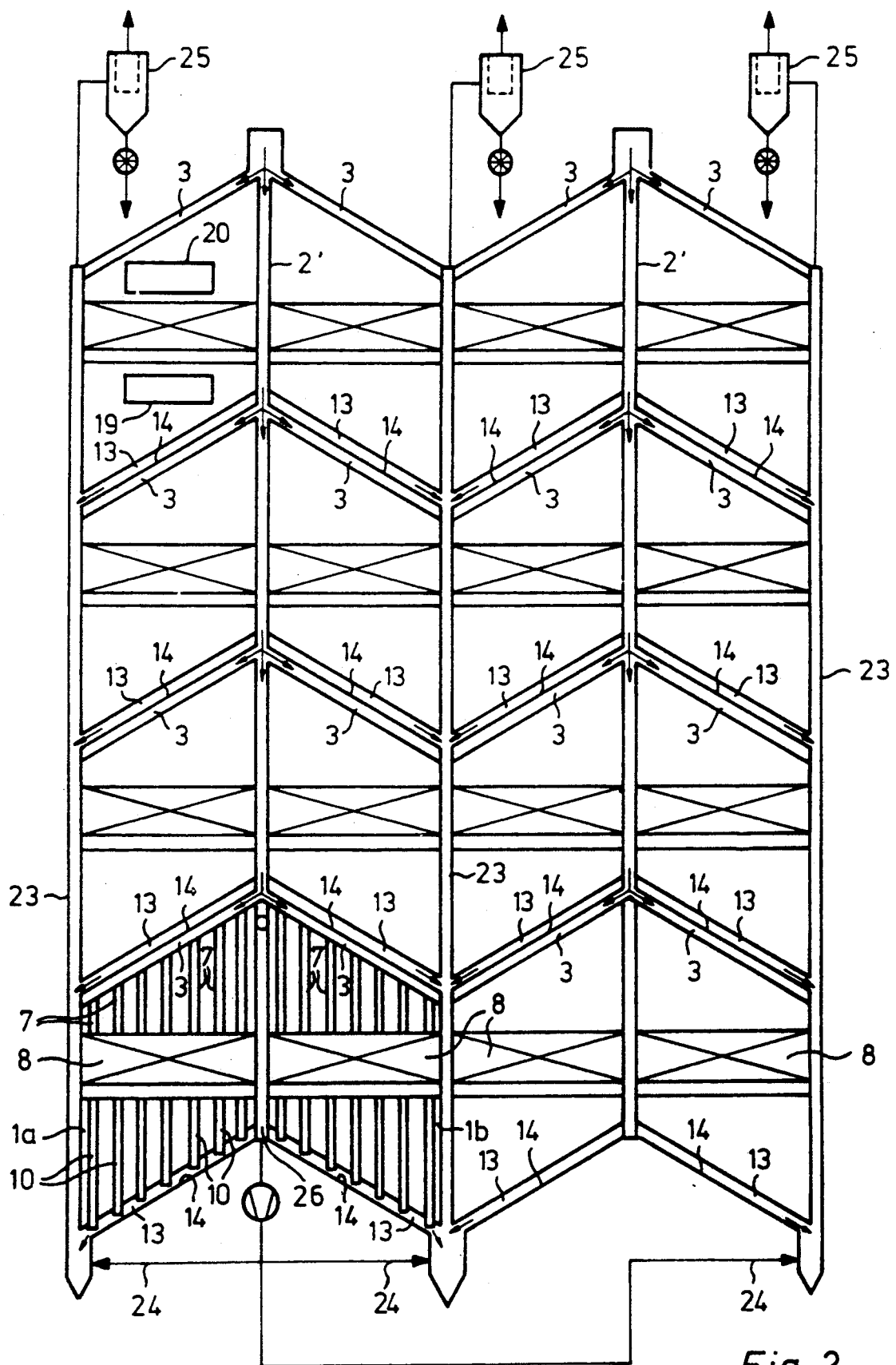
FIG. 2 shows schematically the principle of an industrial-scale reactor installation with the use of reaction chambers of the type illustrated in FIG. 1, built up in module fashion in superimposed and side-by-side relationship and being combined into a compact structural unit.

In the reactor installation shown in FIG. 2, a plurality of reaction chambers similar to that of FIG. 1 is combined in module fashion into an especially compact structural unit. As for the structure and basic operation of each individual reactor stage, reference can be had to the single-stage reactor installation of FIG. 1. The structural details are omitted in FIG. 2 for most of the reactor stages; only two juxtaposed reaction chambers 1a and 1b are shown with the inlet tubes 7 and outlet tubes 10 whereas these details are not illustrated in the other fourteen reaction chambers of the reactor installation.

In the embodiment of FIG. 2, four reaction chambers are arranged in superposition and four are arranged in side-by-side relationship. Respectively two neighboring columns of superimposed reaction chambers are supplied with bulk material by way of a joint vertical feeding shaft 2'. On both sides, distributing channels 3 emanate from this shaft 2' in a herringbone pattern, in each case inclined obliquely toward the outside. Each distributing channel 3 terminates in the zone of the side wall of the associated reaction chamber to be supplied. As can be seen, eight distributing channels 3 are supplied by way of each feeding shaft 2'. The bottom wall of each discharge channel 13, provided with the sliding surface 14, simultaneously constitutes the cover wall of a distributing channel 3 disposed therebelow.

The discharge channels 13 of the superimposed reactor chambers and/or stages pertaining to a reactor column terminate into a joint discharge shaft 23 for bulk material. The central discharge shaft 23 between the two central reactor columns is charged with bulk material from both sides out of the adjoining discharge channels 13. The bulk material drops downwardly through the discharge shafts 23 and is removed at the bottom end of each shaft. In the embodiment illustrated in FIG. 2, a gas inlet 24 is provided at the bottom end of each discharge shaft 23 through which gas is introduced into the discharge shaft 23 during operation and is conducted against the dropping direction of the bulk material vertically upwardly to a filtering device 25 arranged at the top end. On account of the upwardly directed gas streams in the discharge shafts 23, a certain screening of the bulk material is achieved, and the relatively lightweight solid particles are entrained upwardly to the associated filtering device 25 and separated at that point. At the same time, with the aid of the upwardly oriented gas stream, the dropping velocity of the bulk material can be controlled in a suitable way. The gas stream is preheated in a preheating chamber 26 before entering through the inlet 24; the preheating chamber 26 is located between the two reaction chambers 1a and 1b in a space present underneath the lowermost branching-off point of the feeding shaft 2'. In this zone, an especially intensive heat exchange occurs by way of the two adjacent walls of the adjoining reaction chambers 1a and 1b, enhancing the preheating of the screening gas. Preheating of the bulk material in the inclined distributing chambers 3 occurs as well, namely during the residence time of the bulk material in the associated feeding and/or distributing channels 3.

The direct superposition of the reaction beds 8, the distributing channels 3, and the discharge channels 13 of several reactor stages arranged one above the other optimizes the compact structural design. Subdivision of the reactor chambers into smaller structural units and the herringbone-type arrangement (FIG. 2) also reduce the structural height of the reactor installation. The feeding and discharging of the bulk material, heretofore problematic due to special drive mechanisms and many moving parts, has been accomplished by this invention with optimum reliability and with minimum space requirement.

We claim:

1. Process for conducting a stream of bulk material in at least one moving bed reactor wherein the bulk material is introduced into an upper end of the moving bed reactor by way of a first inclined sliding surface and is discharged at an outlet of a second inclined sliding surface, wherein the bulk material is conveyed in a direction of inclination on both sliding surfaces solely under the effect of gravity, characterized in that:

said bulk material is introduced from a point above the reactor, moves laterally along the first inclined sliding surface, and is discharged at the outlet of the second sliding surface which is inclined in the same direction of inclination;

wherein, with a row of reactors, the bulk material to be fed to a single reactor is branched off from a stream of the bulk material common to several reactors in the row, and several streams of the bulk material, after being separately carried off, are recombined in a single discharge shaft.

2. Process according to claim 1, characterized in that a joint bulk discharge stream is exposed to an oppositely directed gaseous stream, and that dust particles entrained in the gaseous stream are filtered out.

3. Process according to claim 2, characterized in that, by varying speed and volume of the gaseous stream, dropping velocity of the dust particles removed in the joint bulk discharge stream is reduced.

4. Process according to claim 2, characterized in that the gaseous stream is preheated by heat exchange with at least one reaction chamber in order to avoid condensate formation.

5. Reactor installation, in particular a moving bed reactor installation, comprising:

at least one reaction chamber (1) having at least one inlet (7) and at least one outlet (10, 15) for passing therethrough a bulk material from top to bottom countercurrently to a gas, at least one flow baffle (9) through which the gas is conducted from the bottom toward the top into the bulk material in the reaction chamber (1), at least one first sliding surface (4') for the bulk material, being arranged above the reaction chamber (1) and supplying the inlet (7) of the reaction chamber (1) with bulk material, and at least one second sliding surface (14) for the bulk material, arranged below the outlet (10, 15) of the reaction chamber (1), wherein the sliding surfaces (4', 14) are inclined with respect to a horizontal axis of the reaction chamber (1) to such an extent that the bulk material is conveyed in a direction of inclination solely under action of gravity, characterized int hat the first sliding surface (4') and the second sliding surface (14) are inclined in the same direction of inclination.

6. Reactor installation according to claim 5, characterized in that the first sliding surface (4') is provided with a bulk distributing plate (4).

7. Reactor installation according to claim 5, characterized in that several reactor chambers (1) are arranged in superposition, wherein first sliding surfaces (4') of several superimposed reaction chamber (1) are branched off at their respective upper ends from a joint feeding shaft (2') extending in the vertical direction, and also wherein at least several second sliding surfaces (14) terminate at their respective lower ends into a joint bulk discharge shaft (23) through which the bulk material is removed under the action of gravity.

8. Reactor installation according to claim 6, characterized in that the bulk distributing plate (4) provided for the first sliding surface (4') is a bottom wall of a channel (3), and that the bulk material in the channel (3) is in heat-exchange relationship with an interior of an associated reaction chamber (1) through the bulk distributing plate (4), so that the bulk material can be preheated by the reaction chamber (1).

9. Reactor installation according to claim 5, characterized in that a distributing channel (3) is bounded in its bottom side by the first sliding surface (4') and has a top cover wall.

10. Reactor installation according to claim 5, characterized in that the first sliding surfaces (4') and the second sliding surfaces (14) have, in pairs, essentially identical angles of inclination with respect to the horizontal axis of the reaction chambers (1).

11. Reactor installation according to claim 9, characterized in that spacing between the first sliding surface (4') and the cover wall of the distributing channel (3) increases in a flow direction (5).

12. Reactor installation according to claim 6, characterized in that several inlets (7) project from each bulk distributing plate (4) downwardly into the reaction chamber (1).

13. Reactor installation according to claim 5, characterized in that several outlets (10) are extended from the flow baffle (9) downwardly through a bottom wall (12) of the reaction chamber (1).

14. Reactor installation according to claim 5, characterized in that downwardly extending inlets (7) and outlets (10) are made to flare slightly in trumpet fashion from top to bottom.

15. Reactor installation according to claim 5, characterized in that several reaction chambers (1), serving for different types of treatment, are connected in series and are traversed in succession by a flow of the gas.

16. Reactor installation according to claim 15, characterized in that two series-connected reaction chambers (1) are arranged in pairs with lateral displacement with respect to each other.

17. Reactor installation according to claim 16, characterized int hat the two series-connected reaction chambers (1) are arranged in superposition.

18. Reactor installation according to claim 17, characterized in that at least two columns of superimposed series-connected reaction chambers (1) are arranged side-by-side.

19. Reactor installation according to claim 7, characterized in that an inlet (24) for the gas is arranged at the bottom of the reaction chamber (1) and a filtering device (25) is arranged at an upper end of the joint bulk discharge shaft (23).

20. Reactor installation according to claim 19, characterized in that the inlet (24) for the gas is connected to a gas preheating chamber (26) located between two juxtaposed and, in particular, bottom-positioned reaction chambers (1a, 1b) and is heatable by heat exchange with said reaction chambers (1a, 1b).

21. Reactor installation according to claim 5, characterized in that the reaction chamber (1) has a rectangular cross section.

22. Reactor installation according to claim 7, characterized in that means for deflecting the bulk material are provided at the upper ends of the first sliding surfaces (4') from the joint feeding shaft (2').

23. Reactor installation according to claim 5, characterized in that the reaction chamber (1) has a gas sealing wall (11) on the bottom, said sealing wall (11) being inclined in the same direction of inclination as the second sliding surface (14) located underneath the outlet (10, 15), and further characterized in that a passage opening (21) is formed in a lower end of the sealing wall (11), whereby solid particles separated from the gas are removable through this passage opening (21) into a discharge channel (13).

* * * * *